United States Patent [19]

Bey et al.

[11] 4,375,726

[45] Mar. 8, 1983

[54] GYRO COMPASS

[75] Inventors: Ulf Bey, Heikendorf; Martin Lässig; Hermann Stötzer, both of Kiel, all of Fed. Rep. of Germany

[73] Assignee: Anschutz & Co., GmbH, Kiel, Fed. Rep. of Germany

[21] Appl. No.: 276,989

[22] Filed: Jun. 24, 1981

[51] Int. Cl.³ .................................................. G01C 19/38
[52] U.S. Cl. ....................................... 33/324; 33/327; 33/346; 74/5.5
[58] Field of Search ................ 33/324, 327, 327 B, 33/344, 345, 346; 74/5.5

[56] References Cited

U.S. PATENT DOCUMENTS

| Re. 15,072 | 3/1921 | Ford et al. | 33/327 |
| 1,279,471 | 9/1918 | Sperry | 33/324 |
| 1,445,279 | 2/1923 | Henderson | 33/344 |
| 2,930,240 | 3/1960 | Rellensmann et al. | 33/327 |
| 3,146,530 | 9/1964 | Clark et al. | 33/327 |
| 3,162,951 | 12/1964 | Hintze et al. | 33/327 |
| 3,512,264 | 5/1970 | Ambrosini | 33/324 |

FOREIGN PATENT DOCUMENTS 228818 11/1910 Fed. Rep. of Germany ........ 33/324

*Primary Examiner*—Richard R. Stearns
*Attorney, Agent, or Firm*—Shlesinger, Fitzsimmons & Shlesinger

[57] ABSTRACT

In this gyro compass the direction-indicating gyro system is suspended pivotably in all directions from a pendulum, which is mounted to rotate about a vertical axis in a frame integral with a ship, and which has on its upper end an element that extends into a tank containing a damping fluid for dampening oscillations of the pendulum.

5 Claims, 3 Drawing Figures

GYRO COMPASS

This invention relates to a gyro compass of the type used on ships and the like, and more particularly to improved damping means for such compass.

In a known gyro compass of this type, such as for example disclosed in German Auslegeschrift No. 1 160 654, a band is employed for suspending the gyro system from a support that is rotatable about a vertical axis, whilst pendular movements of the suspended gyro system are not damped. The bellows connecting this gyro system to the support also does not have a damping effect. It is the underlying aim of the invention to equip a gyro compass of the above-explained construction with a simple and efficacious device for damping pendular oscillations of the gyro system.

This aim is achieved according to this invention by the construction disclosed hereinafter by the following specification and accompanying drawings.

Figure 1:
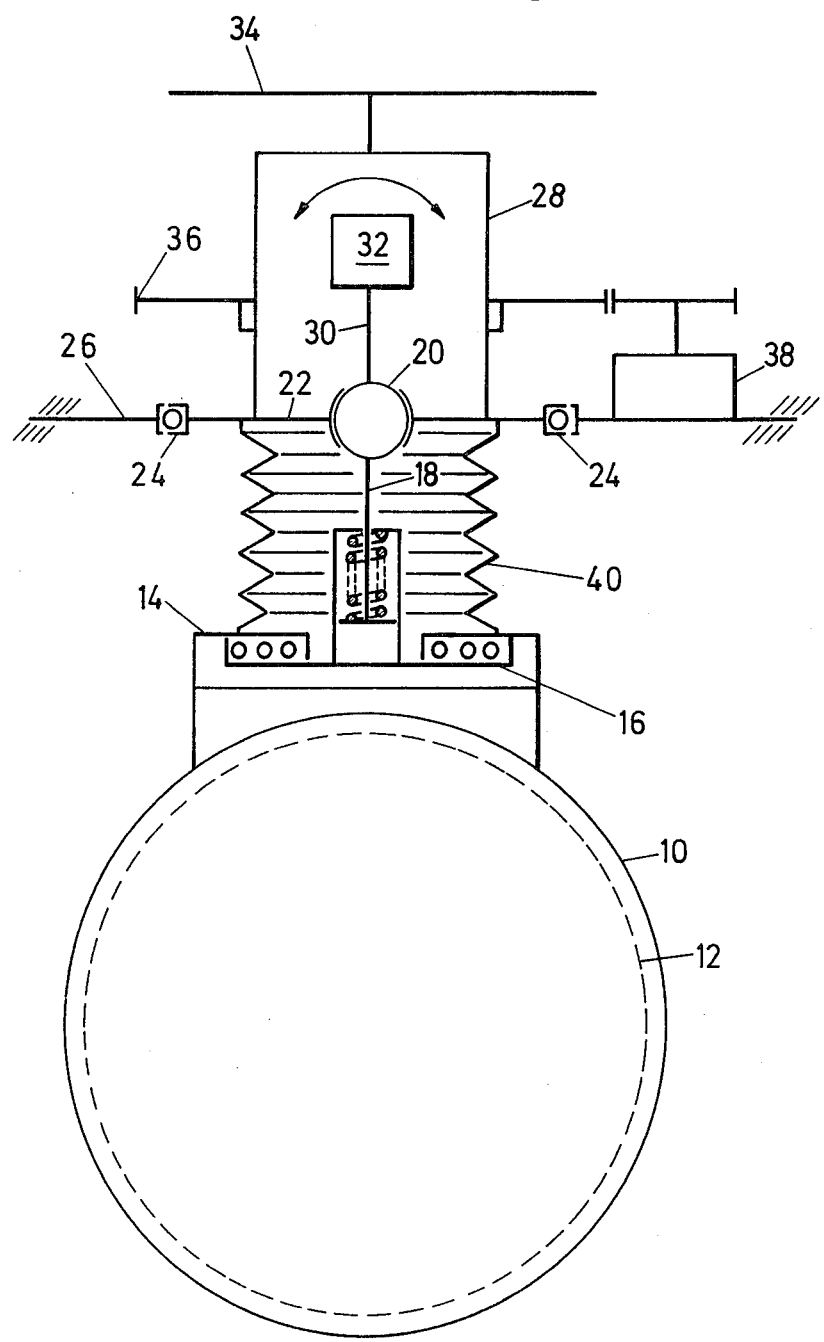
Figure 2:
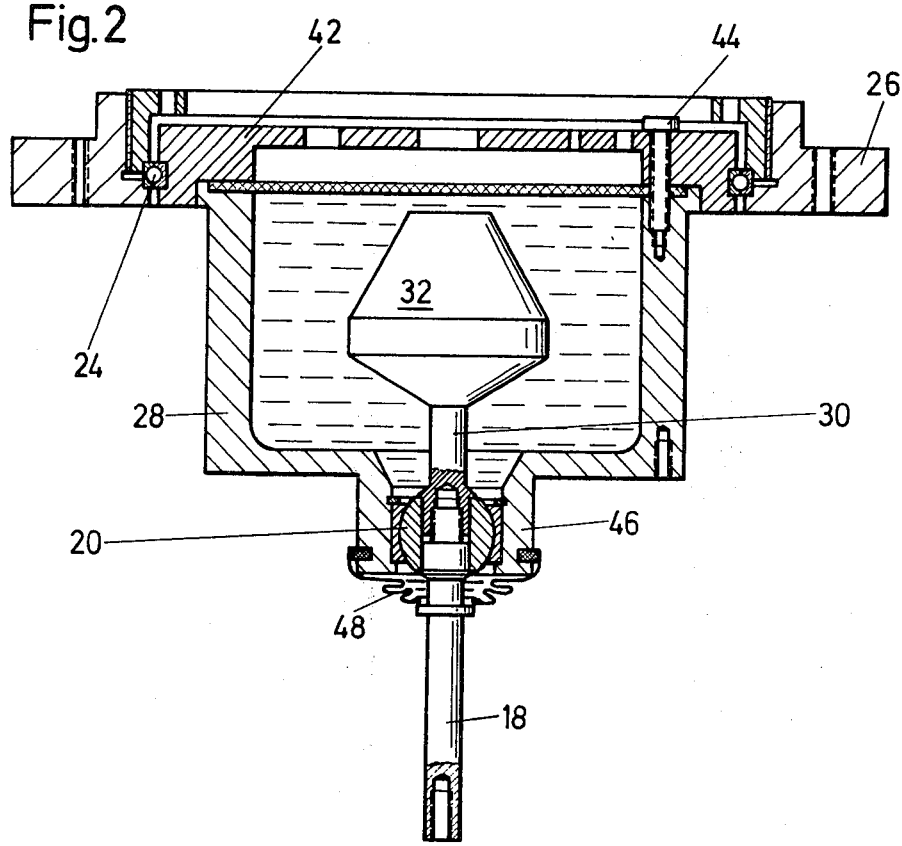
Figure 3:
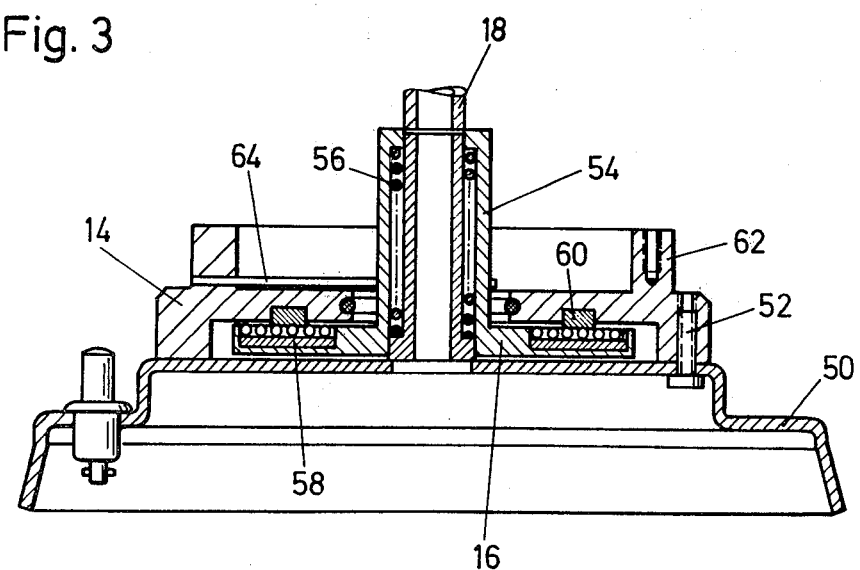

In the drawings, in which exemplary embodiments of the invention are illustrated, FIG. 1 shows a schematic longitudinal section through a gyro compass, made according to one embodiment of this invention;

FIG. 2 shows axial section through a somewhat modified embodiment in which the compass support is mounted rotatably in a frame which is integral with a ship, and extends into a tank containing a damping liquid; and FIG. 3 is a cross sectional view showing the central part of FIG. 1 on a larger scale.

Referring now to the drawings, an envelope ball 10, in which a ball 12 containing the gyro system floats in a liquid and is centered in manner not shown, rests rigidly upon an annular disc 14 which is arranged coaxially to the vertical envelope ball 10 and is braced slidably in all horizontal directions upon a parallel annular disc 16 located beneath it. The annular disc 16 is suspended resiliently from a pendulum 18 arranged coaxially to it, which is suspended by means of a universal joint 20 from a support in the form of a horizontal turntable 22. This turntable is supported through ball-bearings 24 by a platform 26 intergral with the ship. The turntable 22 forms the bottom of a liquid tank 28, into which an upper prolongation 30 of the pendulum 18 projects and carries an element 32 there. The liquid tank 28 contains a viscous liquid, e.g. a silicone oil, which has a damping effect upon the element 32 in the case of oscillations of the pendulum 18. The compass rose 34 is mounted on the top of the liquid tank 28.

The tank 28 carries on its circumference a ring gear 36 which meshes with the pinion of a follow-up motor 38, which is controlled in known manner by the ball 12 accommodating the directional gyro system.

In order to transmit the rotation of the turntable 22, connected to the tank 28, to the envelope ball 10, the pendulum 18 is surrounded at an interval by a bellows 40, the top edge of which is attached to the turntable 22 and the bottom edge to the annular disc 14. Compared to the inherently possible connection of the support formed by the annular disc 22 to the envelope ball 10 by a cardan suspension, this bellows presents the advantage that it effects the transmission of the rotary movements of the support to the envelope ball free of cardan errors in the case of a pronounced oblique position of the pendulum 18.

The embodiment of FIG. 2 differs from that of FIG. 1 only in that the ball-bearing 24 is arranged, not only on the bottom, but on the cover 42 of the tank 28. This cover is screwed to the wall of the tank 28 at the top at 44. Particulars of the ball joint 20 may also be seen from FIG. 2. In order to seal the latter so as to prevent loss of liquid, it is arranged inside a nozzle 46 provided on the bottom of the tank 28, which is sealed underneath by a soft bellows 48. The top edge of this bellows is placed on the nozzle 46 and its bottom edge on the pendulum 18.

FIG. 3 shows in detail the suspension of the envelope ball 10 from the pendulum 18 by means of the annular discs 14 and 16.

The envelope ball 10 has attached to it coaxially with its vertical axis a cover 50, to which the horizontal annular disc 14 is attached coaxially, with a space therebetween, with screws 52.

The annular disc 16 is formed by the bottom flange of a sleeve 54 which has an inwardly extending flange at its upper end and is engaged by a helicoidal compression spring 56. The latter surrounds the lower end of the pendulum 18 and is braced against an exterior shoulder of this pendulum, which projects into the sleeve 54.

The annular disc 16 has on its top side an annular cavity to house a plane ball race 58, above which bearing balls are present. On the latter runs an annular disc 60 which is let into a groove on the underside of the disc 14 and is of such narrow dimensions that it has ample play inwards and outwards in the cavity which accommodates the race 58. It is thereby ensured that the disc 14 can slide in all horizontal directions upon the disc 16. Both discs can move upwards and downwards on the pendulum 18, spring biased by the spring 56.

The sleeve 54 is resiliently captive in its coaxial position to the annular disc 14. For this purpose the annular disc 14 has on its top side a flange 62 with a ring of horizontal bores into which resilient thin rods 64 are inserted, which abut with their inwardly directed ends against the outside of the sleeve 54 and therefore tend to center the latter with reference to the annular disc 14.

The bellows 40 may consist of rubber, leather, plastic or also metal.

The exemplary embodiment described is capable of variation in many respects. For instance, it is possible to attach the pendulum 18 rigidly to the sleeve 54 and to arrange the platform 26, not integral with the ship, but sprung in the vertical direction. The ball and socket joint 20 may be replaced by a universal joint.

The resilient rods 64 may be replaced by traction springs arranged in stellate formation.

A variation may also consist in that the sliding mobility of the gyro system 10, 12 on the pendulum 18 in the transverse direction is obtained by parallel surfaces 14, 16, constructed as slip-ring discs, provided on the pendulum 18 and on the gyro system 10, 12.

What we claim is:

1. In a gyro compass, the direction-indicating gyro system of which is mounted on a rigid pendulum that is suspended intermediate its ends to pivot in all directions from a suspension point on a support which is mounted to rotate about a vertical axis in a frame integral with a ship, and which support is coupled to the gyro system by a bellows surrounding the pendulum adjacent said suspension point, improved suspension means characterized by means connecting said rigid pendulum beneath its suspension point to the gyro system slidably to support said system for movement in translation longitudinally and transversely of said pendulum, and in a sprung manner, and an element arranged on said pendulum above the suspension point, and movable in a damping liquid contained in a tank mounted on said support.

2. A gyro compass according to claim 1, characterized in that the gyro system is suspended by said connecting means from the pendulum.

3. A gyro compass according to claim 1, characterized in that the sliding mobility of the gyro system on the pendulum in the transverse direction is obtained by means defining parallel surfaces slidable relative to each other and provided on the pendulum on the gyro system, respectively.

4. A gyro compass according to claim 1, characterized in that the sliding mobility of the gyro system on the pendulum in the transverse direction is obtained by plane parallel surfaces provided on the pendulum and on the gyro system, respectively, and with bearing balls present between said surfaces.

5. A gyro compass according to claim 1, characterized in that a ball and socket joint is employed for the suspension of the pendulum from said point.

* * * * *